United States Patent [19]

Chen

[11] Patent Number: 4,730,379
[45] Date of Patent: Mar. 15, 1988

[54] ON THE TABLE AUTOMATIC OPERATION TYPE OF PIVOT-PIN FITTING MACHINE

[76] Inventor: Yen W. Chen, 51-1, Lane 50 Kwang Ming Street, Tainan City, Taiwan

[21] Appl. No.: 892,911

[22] Filed: Aug. 1, 1986

[51] Int. Cl.$^4$ .................. B23P 11/00; B21D 53/40
[52] U.S. Cl. ............................. 29/434; 29/11; 29/417; 29/525; 29/564.2; 29/564.8; 227/84
[58] Field of Search ............... 227/84; 29/11, 417, 29/434, 525, 564.2, 564.8

[56] References Cited

U.S. PATENT DOCUMENTS 3,939,552  2/1976  Hart et al. ............... 29/564.2 X
4,047,282  9/1977  Jureit et al. ............... 29/417 X
4,318,555  3/1982  Adamski et al. ............ 227/84 X Primary Examiner—Paul A. Bell
Attorney, Agent, or Firm—Cushman, Darby & Cushman

[57] ABSTRACT

This invention discloses an automatic pivot pin installation apparatus. It mainly consists of two up and down air-cylinders on different sides of a table base. The upper cylinder puts the steel wire into the position of the mold and a cutter driven by the back side cylinder cuts the wire. Pieces of wires then are pressed down to prearranged installation position of the pivot pin. Then the pins are pushed simultaneously into the pin holes of the object fixed at the central mold of the structure base by means of the lower cylinders of each side.

6 Claims, 4 Drawing Figures

FIG: 1

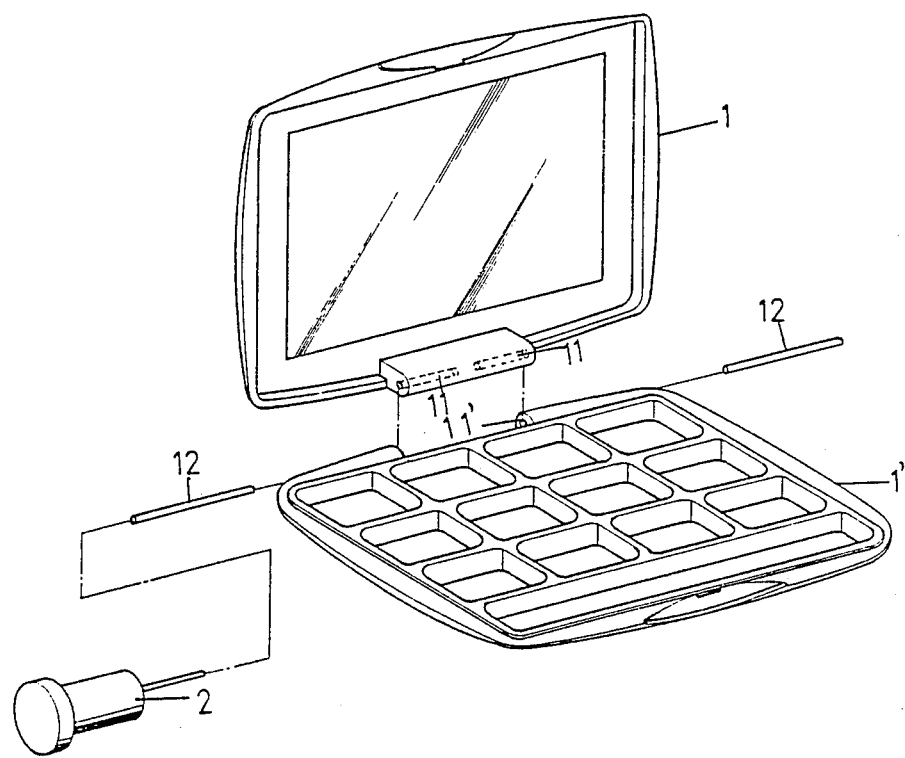
FIG: 4

ON THE TABLE AUTOMATIC OPERATION TYPE OF PIVOT-PIN FITTING MACHINE

BACKGROUND OF THE INVENTION

This invention offers the structure of a pivot pin installer operated automatically on the table. It is mainly used for the pivot joint between a cover and a body of a cosmetic box or any other plastic box in the general market, where the pivot joints are pinned by a small diametral wrist pin.

DESCRIPTION OF THE INVENTION

Please take a look at FIG. 4 first. The pin-fitting way is to cut off a small diametral tube (12) for specified size by a special pipecutting machine. If a different size is needed, the pipe-cutting machine would repeat the cutting. The hole (11) (11)' of a pivot pin of generally used cosmetic box is small and the smaller tube (12) would be picked up by man-power first. It is then put it in hole (11) (11)' of pivot pin of lower part (1) of a cosmetic box. The pin hole (11) (11)' is generally small and so is tube (12). It's very difficult to pass the long tube (12) through the pin hole (11) (11)', (the pin tube (12) and the pin hole (11) (11)' of a cosmetic box must match precisely to make the up-low parts tight). Hence, the pin tubes (12) are tapped in the pin hole (11) (11)' from both sides by pin-hitter (2). This way of pin-fitting, from pin-tube making, pin-fitting to pin-hitting, it's imaginable how much time is spent and how much man power is used.

Besides, in order to make it easy for pin-fitting, the general manufacturer uses the elastic feature of a thin pin tube to make it easy to tap in the pin hole. The problem is that when tapping, the rough surface of thin pin tube would block or even break in the pin hole after several times of opening and closing of the cosmetic box. That's because when the pin-tube is manufactured by plastic ejection mold, there remains a rough surface on the pin-tube that can't be avoided. Then the cosmetic box can't open smoothly.or close tightly after a short period of time. Therefore the defective box would affect the whole quality of the cosmetic. The losses and costs are hard to estimate.

The inventor takes all above defects and studies actively for several years. He invented and improved and manufactured an automatic steel wire delivery, pin cutting and pin fitting. After a long period of time and experiments, it proves that speed, convenience and safety are the main features. It surely offers the manufacturer one profitable tool.

The subject invention improves all the defects of the process now used by the movement of cylinders and the use of cutters which move reciprocally within cutting molds. It saves a lot of labor time and increases efficiency and reduce costs.

SUMMARY OF THE INVENTION

The object of this invention is to provide an automatic pin-fitting machine. These and other objects of the invention are achieved by an automatic pin-fitting machine having a means to support an object on a frame, means for supplying a first and second continuous length of wire from a right and left side to right and left cutters respectively, means for cutting said first continuous length of wire and said second continuous length of wire to form a first and second pin respectively and means to insert said first pin and said second pin in a first and second aperture respectively on said object. The cutting means comprises means to move said right and left cutters reciprocally within right and left cutter molds respectively.

BRIEF DESCRIPTION OF THE DRAWINGS

The first purpose of this invention shows the structure of automatic pin-fitting machine. Through the wire inserting seat, the central shaft of the air-cylinder puts the wire in the position of mold and was cut by another air-cylinder. instantaneously, the iece of wire was pressed down to fitting preparation position. It attains to the purpose of automatic delivery and pin cutting. That's the characteristic.

The another purpose of this invention shows the structure of automatic pin-fitting machine, when the central shaft of both sides air-cylinders were pushed, the pin-fitting rod on central shaft puts pin tube that stays in the pin hole precisely into the pin hole of object that fixed at the central mold of structure base. It attains to the purpose of convenience, fast and assurance for assembling. That's the characteristic.

Attached here 4 FIGS. and description to help your examining committee to understand the structure and function of this invention.

Figure 1:
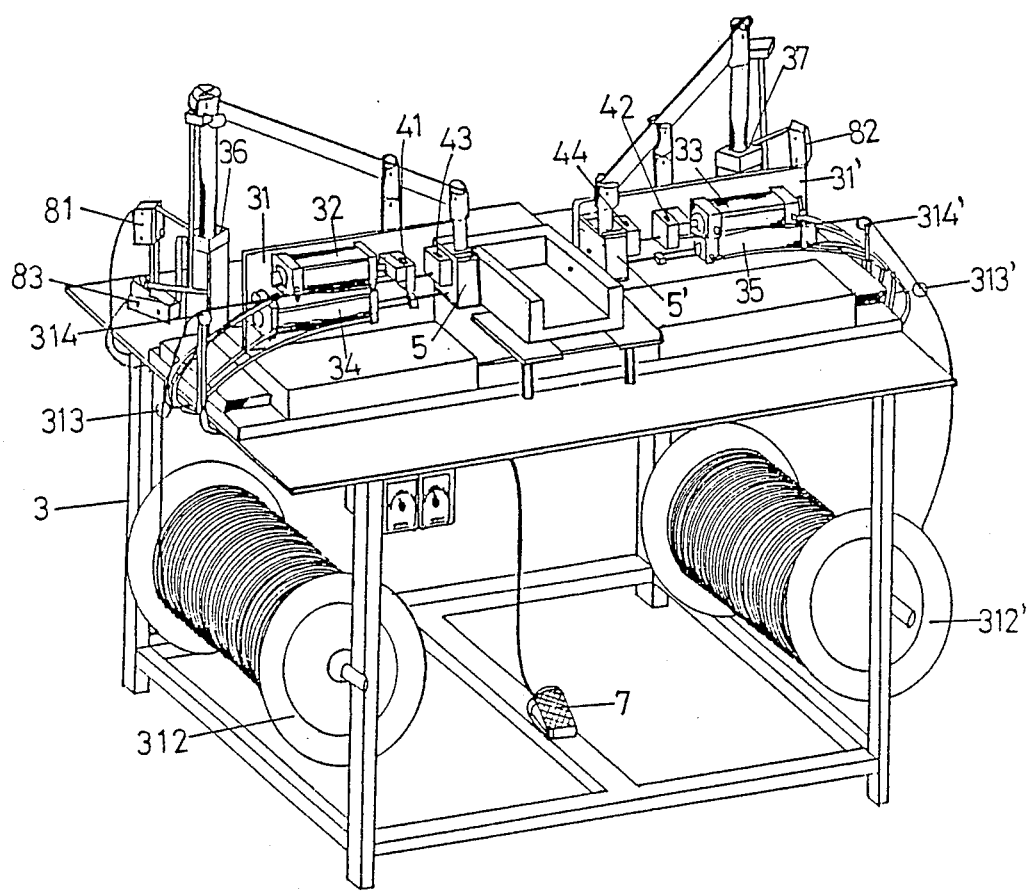

FIG. 1: The outline of this invention.

Figure 2:
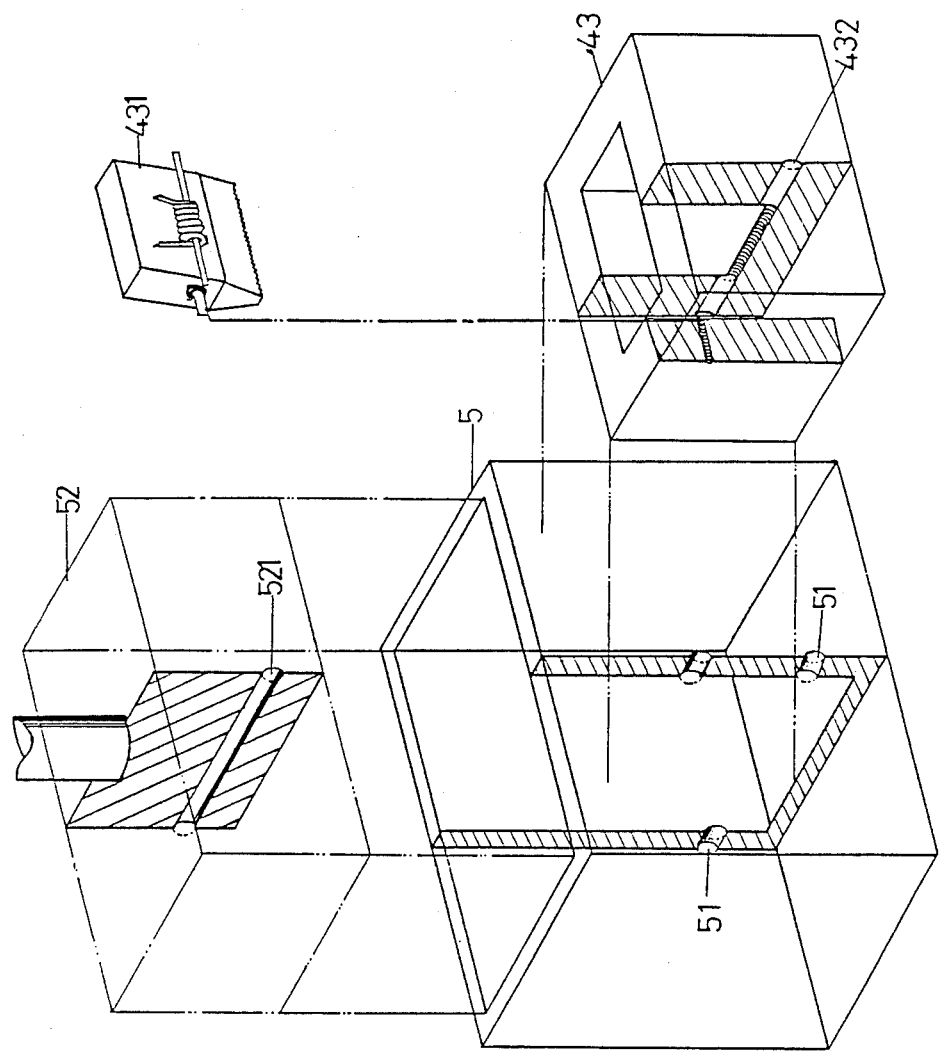

FIG. 2: The sectional plane view of cutting mold and wire inserting seat of this invention.

Figure 3:
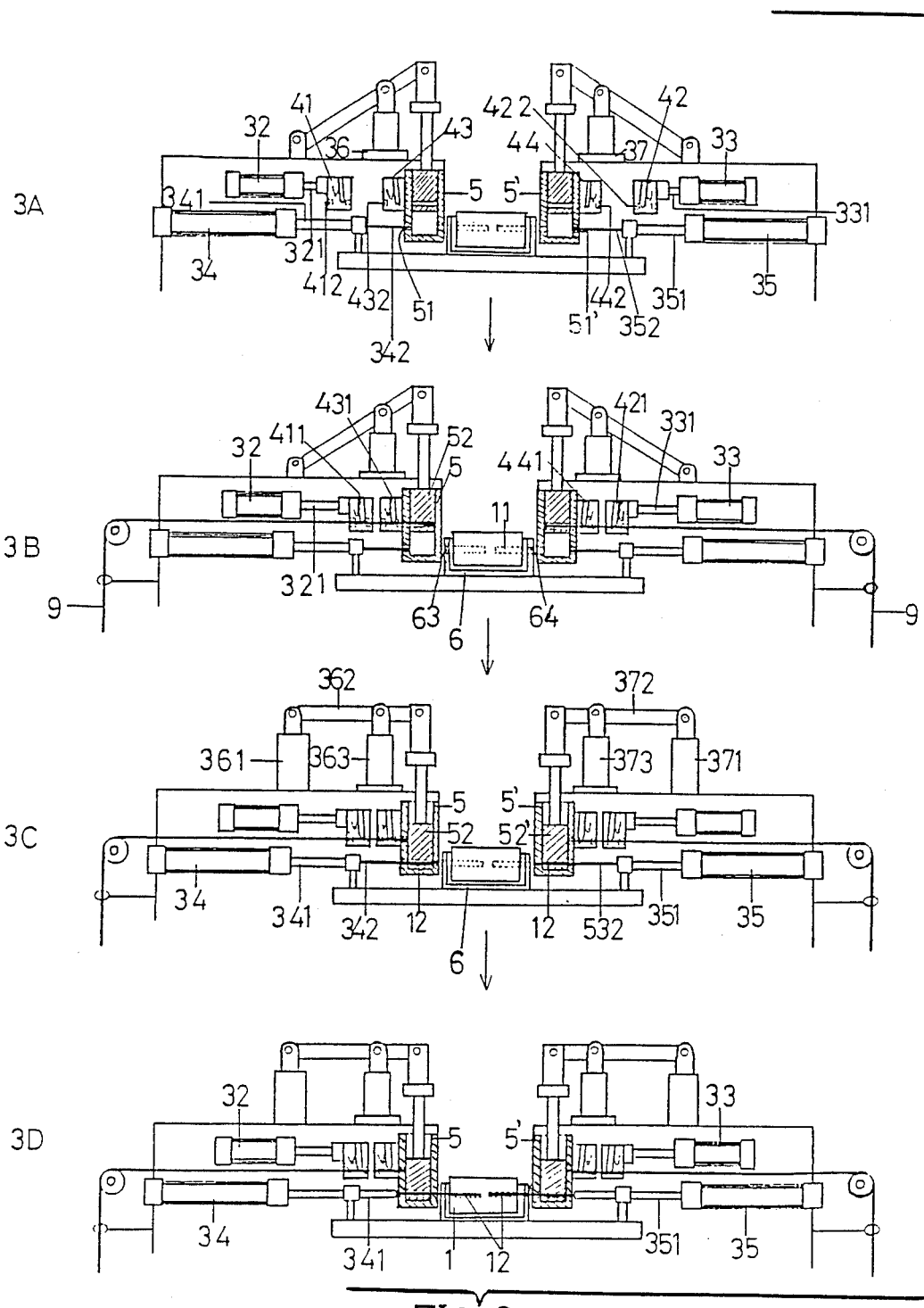

FIG. 3: The step by step operation process of this invention.

FIG. 4: The spare parts of pivot pin of cosmetic box with a pin hitter.

DESCRIPTION OF THE PREFERRED EMBODIMENT

Please take a look at FIG. (1), the main structure of this invention shows two sets of up & down air cylinders (32) (33) (34) (35) at different sides of fixed plates (31) (31)' on the structure base (3). At the back of the two sets of air-cylinders, there are two independent air-cylinders (36) (37) on both sides. At the end of removable pushing central shafts (321), (331) of upper air-cylinders (32) (33) linked by wire inserting seats (41) (42) fixtures (411) (421) are attached. Meanwhile, the end of central shafts (341) (351) of lower air-cylinders (34) (35) are linked by pin-fitting rods (342) (352). Before the pin-fitting rods (342) (352) were operated, they have moved forward to the pin-fitting hole (51) of cutting mold (5) (5)' side wall, but it's end has never stuck into the inside of cutting mold (5), As shown on FIG. (3) A.

At the back on FIG. (1), at the tops of their central shafts (361) (371) links (362) (372) are installed. The other end of these two links (362) (372) connected to the top of cutter (52) of mold (5). When the central shafts (361) (371) of air-cylinders (36), (37) move up and down, the connected links (362) (372) immediately swing up and down by the supporting links (363) (373). the cutter (52) connected to another end of links (362), (372) then moves up and down in the mold (5), and at the side of mold (5), there are wire inserting seats (43) (44),. The heights of fixtures (431) (441), wire holes (432) (442) and wire inserting seats (41) (42) are all at equivalent elevation.

Before operation of this invention please see FIG. 3B, the steel wires (9) on reel (312) (312)' beneath the structure (3) have to be inserted through supporting rings (313) (313)' and go to movable wheels (314) (314)' and pass the wire holes (412) (422) (432) (442) beneath wire inserting seat (41) (42) through the gap between two air-cylinders. Then insert to the wire hole (521) of cutting (52) mold (5) when the wire inserting in the seat is operated. It's convenient to press down the fixtures (411) (421) (431) (441), then put the object to be pinned to fixed mold (6) in the middle of the structure base. This fixed mold (6) can be designed different size for different size of objects. The groove hole between two side walls (81) (82) can fit the object to be pinned. At the equivalent position of side walls (61) (62) and pin-fitting rods (342), (352), there are holes (63) (64) for the movement and push of pin-fitting rods (342) (352).

In operation, a power source is turned on to bring air-cylinder to saturation to be operated. At the same time, switch (7) beneath the structure base is stepped on. Then the cylinders (36) (37) are ready to move and the control shafts of them move upward right away. The links (362) (372) are driven to cut (52) downward quickly (as shown on FIG. 3C. then the steel wire (9) in the wire holes (521) (521)' is cut off to pieces of pins (12) when the cutter moves downward to a specified position, the wire hole (521) (521)' just happen to be on the same line with pin-fitting holes (51), (51)' of cutting mold. The lower cylinders (34) (35) operated by cylinders (36) (37) touch the inching power switches (81), (82) (see FIG. 1). Meanwhile, the pin-fitting rods (342) (352) at the end of central shafts move forward to center and push the pin (12) from pin-fitting hole (53) (53)' to the object of fixed mold through the holes (63) (64) of fixed mold (as shown on FIG. 3D). After the pin-fitting operation is completed, the pin-fitting rods (342) (352) immediately move backward with the central shafts (341), (351) of cylinders. Meanwhile, cylinders (36) (37) also return to original position. The links (362) (372), driven by central shaft (361) (371) make the cutter (52) move up to its original position inside the mold. The central shafts of upper cylinders move forward to center by cylinders (36) (37) touching the inching power switches (83) (84). By means of the support of fixtures (411) (421) on the wire inserting seat, the steel wire (9) is transferred to center through the wire holes (432) (442) of wire inserting seat (43) (44) to enter the position of cutting wire holes (521) (531) of mold (5). Then the function of automatic wire delivery is finished. The operation can be repeated by changing the pinned object for continuously pin-making, pin-fitting and delivery.

When a different size of pin is needed, all that has to be done is to adjust the interval between the wire inserting seat (41) (43) and (42) (44) or to replace cutting mold to adjust the length of steel wire that inserting to cutting mold. It's made for any kind of pin-fitting box and is very convenient.

In conclusion, the structure of this invention is to be very simple. But by means of it's ingenious layout, the process is simplified and it would not only save much time and man-power but prevent operator injury. It's really a practical invention.

I claim as my invention:

1. A method of automatically inserting a first pin into an object, said object having a right side and a left side, said right side having a first aperture disposed to receive said first pin therein and said left side having a second aperture disposed to receive said second pin therein, said method comprising:

supporting said object in a frame;
   supplying a first and a second continuous length of wire to a right cutter and a left cutter;
   cutting simultaneously said wire supplied to said right cutter into a first pin and said wire supplied to said left cutter into a second pin;
   aligning simultaneously said first path with said first aperture in said object and said second pin with said second aperture in said object;
   inserting simultaneously said first pin into said first aperture in said object and said second pin into said second aperture in said object.

2. An automatic pin-fitting machine for inserting first and second pins into an object, said object having a right side and a left side, said right side having a first aperture disposed to receive said first pin therein and said left side having a second aperture disposed to receive said second pin therein comprising:

means for supporting said object on a frame;
   a right and a left cutter;
   means for supplying a first and a second continuous length of wire to said right and said left cutter respectively;
   means for cutting said wire supplied to said right cutter into a first pin and for cutting said wire supplied to said left cutter into a second pin and for aligning said first pin with said first aperture in said object and said second pin with said second aperture in said object;
   means for inserting said first pin into said first aperture in said object and said second pin into said second aperture in said object.

3. A pin-fitting machine as in claim 2 wherein said wire supplying means comprises:

a first reel around which said first continuous length of wire is wound;
   a first fixture disposed proximate to said right side of said object having an aperture through which said first continuous length of wire is gripped;
   a first power means to move said first fixture toward and away from said right cutter;
   a second reel around which said second continuous length of wire is wound;
   a second fixture disposed proximate to said left side of said object having an aperture through which said second continuous length of wire is gripped;
   a second power means to move said second fixture toward and away from said left cutter means.

4. A pin-fitting machine as in claim 3, wherein said first power means includes a first air cylinder and said second power means includes a second air cylinder.

5. A pin-fitting machine as in claim 3 wherein said inserting means includes:

a first pin-fitting rod proximate to and in alignment with said first pin when said first pin is aligned with said first aperture on said object, said pin disposed to fit within said aperture on said first cutter;
   a second pin-fitting rod proximate to and in alignment with said second pin when said second pin is aligned with said second aperture on said object, said pin disposed to fit within said aperture on said second cutter;
   means to move said first pin-fitting rod toward and into said aperture on said first cutter; and
   means to move said second pin-fitting rod toward and into said aperture on said second cutter.

6. A pin-fitting machine as in claim 5 wherein said cutting means includes:

a right and left air cylinder, each having a connection end;

a right and left link having a first end connected to right and left air cylinders respectively and a second end connected to said right and left cutters respectively, each of said links having a pivot point, said pivot point being intermediate said first and second ends;

a right and left supporting link, each having a first end connected to said frame and a second end pivotally connected to said pivot point on said right and left link respectively, so that said right and left supporting links cooperate with said right and left link to move said right and left cutters reciprocally in response to the reciprocal movement of said right and left air cylinders respectively.

* * * * *